Patented June 9, 1925.

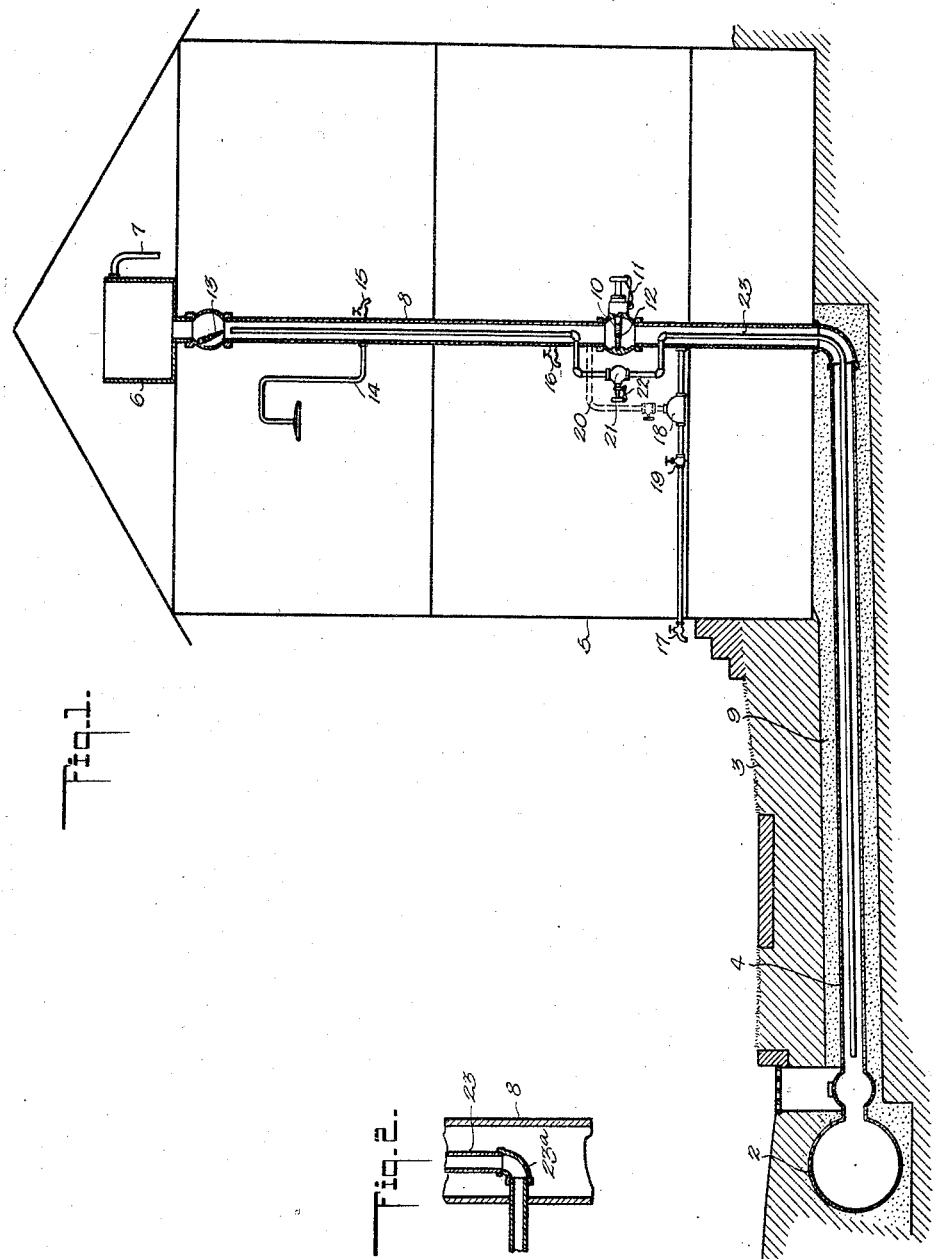

1,541,719

UNITED STATES PATENT OFFICE.

HONORÉ LACOURCIÈRE, OF BROOKLYN, NEW YORK.

WATER FLOW SYSTEM.

Application filed September 27, 1923. Serial No. 665,185.

*To all whom it may concern:*

Be it known that I, HONORÉ LACOURCIÈRE, a subject of the King of Great Britain, and a resident of the city of New York, borough of Brooklyn, in the county of Kings and State of New York, have invented a new and Improved Water Flow System, of which the following is a full, clear, and exact description.

This invention relates to a water flow system, and has for an object the provision of means whereby in flow systems of municipalities, especially where the water is supplied to a large number of houses through service pipes, a continuous flow of water through said pipes can be provided at all times so that the liability of the water in said pipes to freeze will be minimized.

Another object concerns the provision of means whereby the previous object can be effected by the use of simple, economical apparatus capable of being readily and easily adjusted to the point of the most efficient consumption of the water.

The invention is illustrated in the drawings, of which—

Figure 1 is a diagrammatic section through a house supplied with water in accordance with this system and showing the ground up to the street water lines;

Figure 2 is a detail section of the piping within the house.

The form of the invention shown in the drawings is a preferred form, although it is understood that modifications in the construction and arrangement of the parts and in the character of the materials used may be adopted without departing from the spirit of the invention as set forth in the appended claims.

As is usually the case, the street 1 is provided with the usual watermain 2 from which and underneath the ground 3 a service pipe such as 4 extends into a house 5, this pipe extending up through the house to a point near the top where it is connected to a tank 6, of any suitable dimensions, from which an overflow pipe 7 extends. The portion of the service pipe 4 disposed within the housing is designated by the numeral 8. Outside the house the service pipe is preferably surrounded by suitable material, designated by the numeral 9, which material may be ordinary earth, sand, gravel, cement, or, in certain circumstances, may preferably be heat-insulating material of any desired kind, for the purpose of insulating the service pipe 4 from the cold along those parts of the pipes which lie in the ground.

The service pipe 8 within the house is provided with a main high pressure valve 10 which is suitably apertured as at 12 and provided with a seal 11 which is placed thereon to hold the valve in any desired position. The upper end of the service pipe is provided with a pivoted gate valve 13 suitably apertured and adapted to be so disposed normally as to keep the pipe open but to be closed automatically when sufficient pressure of water is in the service pipe so that when this pressure occurs the tank 6 will not overflow. The service pipe throughout the house is tapped by various domestic plumbing appliances, such as a shower bath 14 and faucets 15 and 16. Outside faucets such as 17 may be provided and connected with the service pipes in lines provided that require devices such as a meter 18. This line is also provided with a gate valve 19 whereby it may be closed off as desired. If desirable the meter 18 may also be connected by an auxiliary pipe line such as 20, shown in dotted line, to a point in the service pipe above the high pressure valve 10.

A gate valve 21 having a seal 22 to hold it in any desired position is disposed outside the service pipe in a small pipe line 23 which extends within the service pipes 4 and 8 from a point near the street to a point near the tank 6. This small pipe is properly dimensioned so that for a given pressure in the watermain 2 a desired flow can pass therethrough. This flow can further be regulated by the setting of the valve 21.

As shown in Fig. 2, the small pipe 23 extends outside the service pipe along that portion of it in which the valve 21 is disposed, but above said valve the small pipe is provided with an elbow which is apertured as at 23ª (see Fig. 2) so that in case the water supply fails the water in the pipe 23 above said elbow will drain out.

In the operation of the device, it will be observed that, considering the main service pipes 4 and 8 and the high pressure valve 10, there will be a constant though small flow of water from the main 2 into the tank 6, and this constant flow, in addition to the heat insulation supplied around the service pipe as it passes through the ground, tends to prevent the freezing of the water. However, when I prefer to add the auxiliary pipe 23 and dispose it within the service pipe, it will be obvious that in accordance with the setting of the valve 21 a greater or less flow of water through said small pipe will be always taking place, and this flow of water through this pipe will so regulate its temperature with respect to the water around it in the service pipe that although ice may form in the service pipe a thin film of water will always be found adjacent the small pipe and that as soon as the high pressure valve is open, or any of the plumbing fixtures in the house are opened, there will be a tendency for whatever ice there is in the service pipe to melt instantly because of the admission into the system of this greater quantity of relatively warmer water. By providing this auxiliary small pipe, therefore, I am assured that the water in the center of the service pipe is not freezing, although the remainder of the area of the service pipe may be filled with ice. This tendency, however, is considerably prevented by the presence around the service pipe of heat insulating material.

Whenever it is desired to supply a maximum amount of water to the house, the gate valve 10 can be opened. This is generally the case whenever a fire occurs. When the full pressure of the water, therefore, in the main 2 is supplied to the house, the gate valve 13 is moved to its closed position automatically, preventing this pressure from exerting its full effect on the tank 6, which would constantly overflow.

It will, therefore, be observable that I have provided a service pipe of substantial diameter from a watermain in the street to a point near the top of the house, and that intermediate the length of this service pipe I place a perforated high pressure valve the position of which can be regulated to determine the constant flow of water therethrough. The perforation of this valve I also provide to permit the draining of this pipe above the valve.

It is also observable that I can also provide a smaller auxiliary pipe extending from the watermains to a point near said tank, this auxiliary pipe lying along almost the entire length within the service pipe and being provided intermediate its length with a valve which can be regulated to determine the flow of water through said auxiliary pipe. The portion of the small auxiliary pipe containing the valve is, of course, outside of the service pipe. If necessary the high pressure valve can be entirely closed and the admission of water into the service pipe above the high pressure valve can be supplied by regulating its flow through the auxiliary pipe until the service pipe above the high pressure valve and including the tank 6 are filled, and the flow is so regulated as to maintain this condition.

What I claim is:—

1. A water system to be disposed between a dwelling house and the watermain in the street, which includes a service pipe of substantial diameter extending from the main into the house and to a point near the top of the house, a tank to which the upper end of said service pipe is connected, a high pressure valve in said service pipe, and an auxiliary pipe disposed within the service pipe, said auxiliary pipe being open always to a definite degree to permit a definite flow of water therethrough independently of the condition of the high pressure valve in the service pipe.

2. A water system to be disposed between a dwelling house and the watermain in the street, which includes a service pipe of substantial diameter extending from the main into the house and from a point near the top of the house, a tank to which the upper end of said service pipe is connected, a high pressure valve in said service pipe, an auxiliary pipe disposed within the service pipe, said auxiliary pipe being open always to a definite degree to permit a definite flow of water therethrough independently of the condition of the high pressure valve in the service pipe, and a valve in said auxiliary pipe for the control of the flow of water therethrough.

3. A water system to be disposed between a dwelling house and the watermain in the street, which includes a service pipe of substantial diameter extending from the main into the house and from a point near the top of the house, a tank to which the upper end of said service pipe is connected, a high pressure valve in said service pipe, an auxiliary pipe disposed within the service pipe, said auxiliary pipe being open always to a definite degree to permit a definite flow of water therethrough independently of the condition of the high pressure valve in the service pipe, and a valve in said auxiliary pipe for the control of the flow of water therethrough, the upper end of the auxiliary pipe extending within the service pipe to a point near the top of the service pipe.

HONORÉ LACOURCIÈRE.